Dec. 18, 1928.
W. H. YEANDLE
1,695,676
RECOVERY OF RUBBER
Filed Dec. 13, 1927
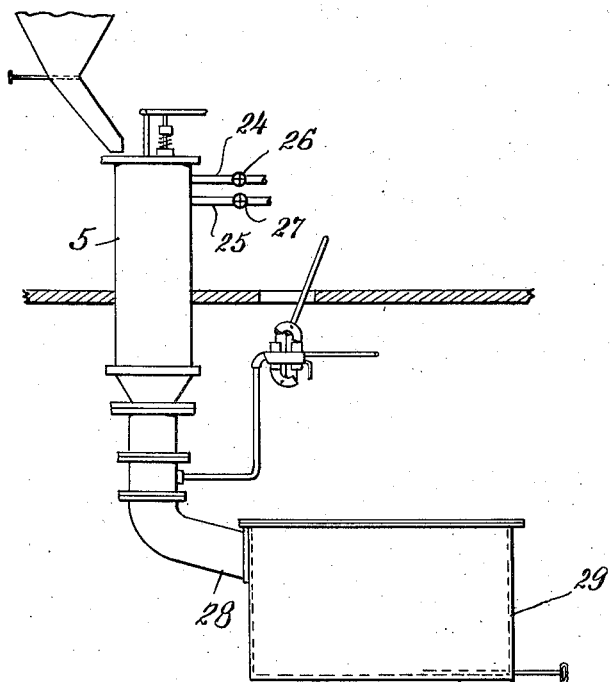
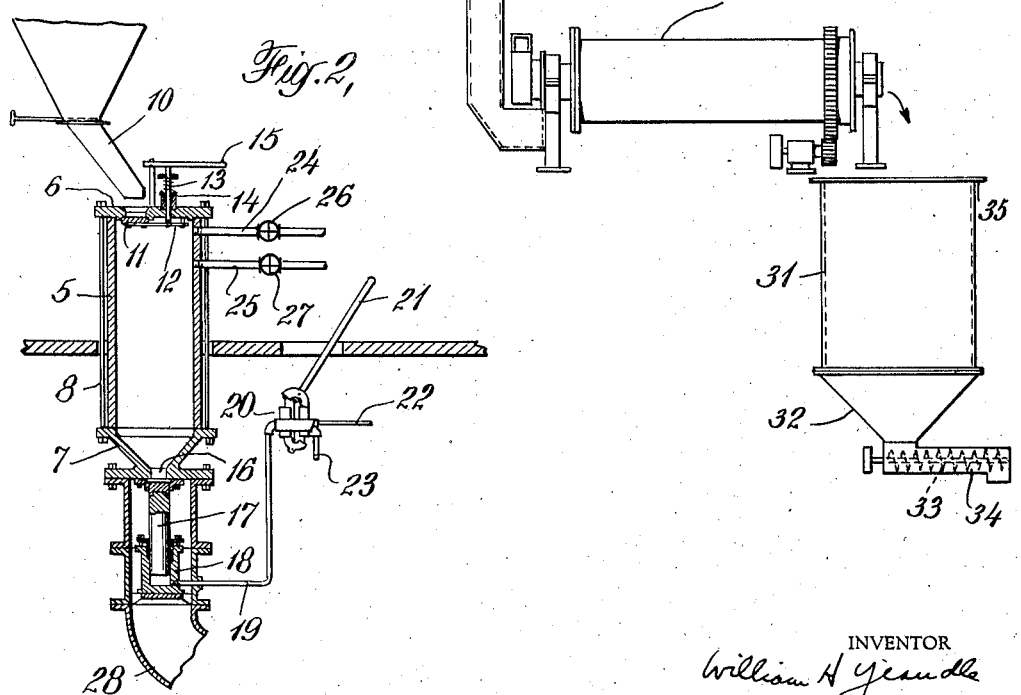
INVENTOR
William H. Yeandle
BY
Pennie Davis Marvin & Edmonds
ATTORNEYS Patented Dec. 18, 1928.

1,695,676

UNITED STATES PATENT OFFICE.

WILLIAM HENRY YEANDLE, OF TORREON, MEXICO, ASSIGNOR TO INTERCONTINENTAL RUBBER COMPANY, OF WILMINGTON, DELAWARE, A CORPORATION OF DELAWARE.

RECOVERY OF RUBBER.

Application filed December 13, 1927. Serial No. 239,806.

This invention relates to the recovery of rubber from guayule shrub, and particularly to an improved method whereby the cellular structure in which the rubber is enclosed can be broken down efficiently to facilitate the separation of the rubber therefrom.

In the guayule shrub rubber is formed in individual cells of the plant, particularly in the cortex, but to some extent in the medullary rays and pith centre. The rubber is in the form of an emulsion and remains in that condition until it is coagulated either by desiccation or by chemical action with an acid. The acid may be formed in the plant or it may be supplied artificially. The rubber emulsion enclosed in the plant cells is static, except for Brownian movement in the living plant, that is to say, it does not migrate from one part of the plant to another as in the case of latex-producing plants such as Hevea.

Because of the peculiar nature of the shrub the rubber cannot be recovered therefrom by tapping as practiced in connection with latex-producing plants. The rubber has been recovered, however, by mechanical treatment. The method heretofore used consists in curing the shrubs, after the latter have been cut, by natural desiccation to induce coagulation of the thousands of minute particles of rubber in the cells. When properly cured the rubber in each cell becomes a minute rubber sponge, measuring perhaps one-hundredth of an inch in diameter enclosed within the cell wall. To release the rubber sponges the shrub is cut in small pieces and is then mixed with water and ground thoroughly in a pebble mill. The grinding breaks down the cell walls to a considerable extent and the minute particles of rubber agglomerate to form particles of about the size of a grain of wheat. These rubber particles are lighter than water whereas the cellulose material becomes more of less water-logged by the beating of air therefrom in the pebble mill. The rubber particles float, therefore, on the surface of the water when the ground material is discharged from the pebble mill and the rubber can be recovered by skimming it from the surface of the water.

Although the method as described is in practical operation, it is nevertheless inefficient. The grinding, even if prolonged, does not rupture the walls of all of the cells. The unbroken cells sink with the refuse material, carrying the rubber therewith. Moreover, the rubber from those cells which are broken up during the latter stage of the grinding operation does not have an opportunity to agglomerate with other particles and such microscopic particles of rubber remain suspended in the water and cannot be separated therefrom by skimming or by any other practicable method. Some of the rubber is, therefore, lost.

Prolonged grinding also breaks down some of the rubber, reduces its tensile-elongation properties, and makes it softer and thus more liable to pick up and retain fibre and other foreign matter. This favors the inclusion of undesirable resins, proteins and carbohydrates derived from the plant structure in the rubber. Also prolonged grinding causes disintegration of the pebbles to a considerable extent, one pound of pebbles being consumed for every seven pounds of dry rubber produced. The finely divided siliceous material from the pebbles is to some extent incorporated in the rubber and constitutes an impurity which lowers the efficiency of separation of the rubber by flotation and decreases its commercial value.

Another disadvantage of the method heretofore used results from the necessity for desiccation to effect coagulation of the rubber. The curing of the shrub is ordinarily attended by a certain degree of oxidation and decrepitation of the rubber which may materially reduce the value of the recovered product.

It is the object of the present invention to provide a method of separating rubber from plants in which the rubber compounds are enclosed within the plant cells, avoiding the difficulties heretofore mentioned and permitting the recovery of rubber of higher quality from such material in a more efficient and economical way.

According to the present invention, the fibrous structure and the cell walls of the guayule shrub and similar plant materials are disintegrated and disrupted by subjecting the material to penetration with suitable gaseous agents which are raised to a sufficient pressure and then permitted to expand substantially instantaneously. The expansion, which is in the nature of an explosion, fractures the cell walls, releases the rubber content thereof and reduces the material to a condition which facilitates the recovery of the rubber either by solution in a suitable rubber solvent or by a limited amount of grinding of the material in water to effect agglomeration of the minute rubber particles. The latter operation may be carried out in smaller apparatus with less power and during a shorter period of time than in the present process. The difficulties attending extended grinding as practiced heretofore for breaking down the cell walls and liberating the rubber are, therefore, avoided.

The gaseous agents employed for penetration and expansion of the material may vary. Steam may be used at pressures which do not involve excessive temperatures. Guayule rubber is not injured by exposure to temperatures up to 300° F. for limited periods of time. Other gases such as air, carbon dioxide, and the like can also be used. Such gases may be combined to avoid any undesirable effect which might result from the use of one of these gases alone. For example, steam can be employed during the initial penetrating stage at low temperature and pressure and air or carbon dioxide or steam can be introduced to increase the pressure prior to the release thereof to effect disruption of the material. Mixtures of air and carbon dioxide can be used also to avoid any undesirable oxidizing effect of air alone. Hot water can be introduced during the initial penetration stage to facilitate softening of the fibre and penetration of the material by the gaseous medium.

During the penetration stage the pressure may be relatively low, e. g., 10 to 100 pounds per square inch. This stage may continue for a relatively short time, for example, from 10 seconds to one minute and may be followed by a shorter period of from, for example, 3 to 5 seconds during which the pressure is increased to, for example, 800 pounds per square inch. The pressure is then suddenly released and the material is discharged from the pressure chamber by the force of the expansion. The material is thereby thoroughly disintegrated, the cell walls are broken down and the rubber exposed, and the material may be delivered in that condition to storage receptacles from which it may be withdrawn and treated either with a rubber solvent or by grinding to effect agglomeration of the rubber particles.

The invention also presents the possibility of effecting coagulation of the rubber emulsion in the cells during the disrupting treatment, thus avoiding the necessity for aging or curing of the shrub prior to treatment. The coagulation may be effected by the heat supplied incidentally with steam when the latter is used, and by using, e. g., suitable acid coagulants which may be introduced with the gases or in a water solution. Such acids, e. g., acetic acid, penetrate the material and effect coagulation of the rubber emulsion so that the subsequent disruption of the material leaves the minute rubber particles in condition for agglomeration. When acids are employed to promote coagulation of the rubber the acids may be neutralized and rendered harmless by subsequently introducing alkaline gases or solutions, e. g., of ammonia, etc., during the penetration or pressure stages. Other reagents may be introduced likewise with the gases to stabilize the rubber hydrocarbon and to prevent decrepitation thereof, such as certain amines or nitrogenous bases. Effective coagulation and subsequent separation of all or substantially all of the rubber is thus ensured and the subsequent operation involving, for example, the agglomeration of the rubber particles can be carried out without danger of deterioration of the product.

The method as described can be carried out more effectively and economically than the method employed heretofore. The operation is more readily controlled and losses resulting from oxidation and decrepitation are avoided or minimized. Substantially all of the rubber is recovered free or practically free from inorganic impurities and relatively free from organic impurities such as resins, etc., and is, therefore, of superior quality. If grinding is utilized to agglomerate the rubber particles the apparatus employed may be lighter and less power is required to operate it. There is a further saving or labor and in the cost of storing the material for desiccation or curing as well as the saving of pebbles and particularly of water which is an expensive factor in desert regions where the guayule shrub grows.

The refuse material remaining after the separation of the rubber particles is substantially cellulose fibre. It is suitable for the manufacture of certain grades of paper and wall boards. The material may be formed into sheets in accordance with usual papermaking practice. The product thus obtained affords another source of revenue resulting directly from the application of the invention.

The method may be conducted in various types of apparatus. Conveniently a thick-walled receptacle having sufficient strength to withstand the pressure employed may be used. Provision should be made for the introduction of the material to be treated and also for the ejection of the material. The latter should include a closure which can be released quickly and without danger as the rapid expansion of the gases in the receptacle causes ejection of the treated material with considerable force. Provision should be made also for the introduction of suitable gaseous agents and liquids and for the application of the necessary gaseous pressure. If steam is used to raise the pressure the steam may be derived from a high pressure boiler. Otherwise pumps will be required to raise the pressure of the gaseous agent.

A tube or pebble mill of suitable capacity corresponding to that of the expansion apparatus is also required if agglomeration of the rubber is to be effected by grinding. The pebble mill may be actuated from any suitable source of power. The grinding may be a batch operation or continuous. The material may be delivered from the pebble mill to a receptacle in which the waste material is permitted to settle and from which the rubber particles which float on the surface can be withdrawn. Apparatus for the further treatment of the rubber may be of the kind usually employed for that purpose.

The invention will be further described with reference to the accompanying drawing illustrating diagrammatically a plant equipped for the practice of the invention, it being understood, however, that the drawing is not limited in its application to the particular apparatus hereinafter described. In the drawing, Fig. 1 is a sectional view of the plant; and
Fig. 2 is an enlarged sectional view of the expansion chamber.

Referring to the drawing, 5 indicates an expansion chamber consisting preferably of a cylindrical casing closed at opposite ends by heads 6 and 7. The latter may be held in place by bolts 8 or otherwise. The expansion chamber should be designed to withstand the pressure which is employed in conducting the operation. The head 6 is provided with an opening 9 through which material can be delivered to the expansion chamber from a hopper 10. The opening is normally closed by a cover 11 supported on a lever 12 within the chamber and operated by a rod 13 extending through a stuffing box 14 and having a lever 15 secured to its outer end. The head 7 is preferably conical in form and has an orifice 16 which can be closed by a plunger 17. The latter is supported within a cylinder 18 which is adapted to be supplied with water under pressure through a pipe 19 under control of a two-way valve 20 having an operating lever 21. Water under pressure is delivered to the valve through a pipe 22 and is exhausted through a pipe 23. The plunger 17 can thus be forced into its closed position under hydraulic pressure and held there during the operation. By exhausting the cylinder 18 through the valve 20 the plunger can be released instantaneously to permit ejection of the material from the chamber 5. Pipes 24 and 25 are connected through the wall of the chamber and are provided with valves 26 and 27 to permit the introduction of gases and liquids to the chamber under suitable control. The gases may be delivered from the usual sources of such gases. Steam, for example, may be supplied from a high pressure boiler (not shown) and suitable pumps (not shown) may be provided to introduce other gases under suitable pressure to the chamber. An outlet pipe 28 is connected to the head 7 at the bottom of the chamber and is adapted to deliver the expanded material to a receptacle 29 wherein it can be stored. From this receptacle the material may be discharged into a pebble or tube mill 30 with a suitable amount of water to facilitate the grinding of the material and the consequent agglomeration of the rubber particles. The pebble mill may be of any suitable or usual construction. It can be actuated from any available source of power sufficient to maintain the operation thereof and to subject the material therein to the necessary grinding or rubbing effect for the purpose indicated. The material may be discharged from the pebble mill to a receptacle 31, preferably cylindrical in form and having a conical bottom 32 with an outlet pipe 33 through which the settled material may be discharged. A worm 34 may be disposed in the outlet if necessary to ensure movement of the refuse material. A launder 35 may be disposed at the top of the receptacle to permit overflow of water therefrom carrying the agglomerated particles of rubber or the rubber particles can be skimmed from the surface of the water as desired. The collected rubber and the refuse material may be treated in any desired manner in apparatus (not shown) and thus worked up into a commercial product.

In carrying out the invention the shrub or other plant material either with or without previous drying is crushed in rollers or chopped to the desired degree of fineness and a suitable charge thereof is disposed in the expansion chamber. The chamber is closed and is supplied then with steam, for example, at low pressure for a brief period sufficient to ensure permeation of the material. Other gases may be introduced with the steam, and acids either in gaseous form or as solutions may be introduced likewise for the purpose of coagulating the rubber. When permeation of the material is assured, that is to say, after a period which will vary depending upon the nature of the material treated, the pressure in the chamber may be increased either by the introduction of steam or other gaseous medium at a sufficiently high pressure. At the same time or prior to the increase in pressure, suitable neutralizing agents of alkaline character may be introduced in the gaseous phase or in solution to neutralize the acid in the mass. Materials intended to stabilize the rubber compounds may likewise be introduced. After a short period of usually from 3 to 5 seconds, the plunger at the bottom of the chamber is released and the gas which has permeated the fibre and the cells of the material expands substantially instantaneously, blowing the material into a mass of fibre and disrupting the cell walls so that the rubber is released.

The disintegrated material is carried to the storage receptacle whence it is introduced to the pebble mill with a suitable quantity of water and there subjected to a limited amount of grinding sufficient only to effect the agglomeration of the rubber particles. The rubber particles can then be separated from the water in the receptacle provided for that purpose and the refuse material can be withdrawn and utilized in any suitable way, for example, for the production of paper or press board.

The invention affords a simple, readily controllable and commercially practicable method of separating rubber from plants and particularly from guayule shrub. It affords numerous advantages herein indicated and others which will be readily apparent. The operation as described can be conducted in various forms of apparatus, and changes and modifications in the apparatus as described as well as in the details of the method can be made without departing from the invention or sacrificing any of its advantages.

I claim:—

1. The method of recovering rubber from plants in which the rubber is enclosed within the plant cells, which comprises permeating the plant material with a gaseous medium under pressure, releasing the pressure substantially instantaneously to disintegrate the material and disrupt the cells, and separating the rubber thus released from the plant material.

2. The method of recovering rubber from plants in which the rubber is enclosed within the plant cells, which comprises permeating the plant material with a gaseous medium, increasing the pressure of the gaseous medium, releasing the pressure substantially instantaneously to disintegrate the material and disrupt the cells, and separating the rubber thus released from the plant material.

3. The method of recovering rubber from plants in which the rubber is enclosed within the plant cells, which comprises permeating the plant material with a gaseous medium under pressure and a coagulating agent for the rubber, and releasing the pressure substantially instantaneously to disintegrate the material and to disrupt the cells and separating the rubber thus released from the plant material.

4. The method of recovering rubber from plants in which the rubber is enclosed within the plant material, which comprises permeating the plant material with a gaseous medium under pressure and with a coagulating agent and a neutralizing agent therefor, and releasing the pressure substantially instantaneously to disintegrate the material and disrupt the cells and separating the rubber thus released from the plant material.

5. The method of recovering rubber from plants in which the rubber is enclosed within the plant cells, which comprises permeating the plant material with a gaseous medium and a stabilizing agent for the rubber compounds and releasing the pressure substantially instantaneously to disintegrate the material and disrupt the cells and separating the rubber thus released from the plant material.

6. The method of recovering rubber from plants in which the rubber is enclosed within the plant cells, which comprises permeating the plant material with a gaseous medium and a coagulating agent for the rubber, increasing the pressure of the gaseous medium, introducing an agent adapted to neutralize the coagulating agent and releasing the pressure substantially instantaneously to disintegrate the material and disrupt the cells and separating the rubber thus released from the plant material.

7. The method of recovering rubber from plants in which the rubber is enclosed within plant cells, which comprises permeating the plant material with a gaseous medium under pressure, releasing the pressure substantially instantaneously to disintegrate the material and disrupt the cells and grinding the disintegrated material with water to agglomerate the rubber particles.

8. The method of recovering rubber from plants in which the rubber is enclosed within plant cells, which comprises permeating the plant material with a gaseous medium under pressure, releasing the pressure substantially instantaneously to disintegrate the material and disrupt the cells, grinding the disintegrated material with water to agglomerate the rubber particles and separating the agglomerated rubber particles by flotation.

9. The method of recovering rubber from plants in which the rubber is enclosed within plant cells, which comprises permeating the plant material with a gaseous medium under pressure, releasing the pressure substantially instantaneously to disintegrate the material and disrupt the cells, grinding the disintegrated material with water to agglomerate the rubber particles, separating the agglomerated rubber particles by flotation and utilizing the plant material for the production of paper products.

10. The method of recovering rubber from plants in which the rubber is enclosed within the plant cells, which comprises permeating the plant material with steam, increasing the gaseous pressure to which the material is subjected, releasing the pressure substantially instantaneously to disintegrate the material and disrupt the cells and separating the rubber thus released from the plant material.

In testimony whereof I affix my signature.

WILLIAM HENRY YEANDLE.